United States Defensive Publication [19] (H) [11] T101,902

Cannan et al. [43] Jun. 1, 1982

[54] PESTICIDAL COMPOSITION AND METHOD FOR TREATING SEEDS PRIOR TO PLANTING

[76] Inventors: Terrance M. Cannan, 10828 Stone Canyon Rd., Apt. #2327, Dallas, Tex. 75230; Lloyd A. McDonald, 612 W. Center St., Medina, N.Y. 14103

[21] Appl. No.: 247,655

[22] Filed: Mar. 25, 1981

[51] Int. Cl.[3] ..... A01N 43/08

[52] U.S. Cl. ..... 424/81; 424/78; 424/285

[57] ABSTRACT

A seed treater composition is disclosed for use in application as an aqueous slurry to plant seeds to protect seeds and seedlings against plant pests, which composition comprises 15% to 50% by weight of 2,3-dihydro-2,2-dimethylbenzofuran-7-yl methylcarbamate pest control agent, 0.5% to 15% by weight of 2-ethylhexyl acrylate copolymer emulsion adhesive sticker having a high solids content of 60% to 70% and a viscosity of 0.5 to 4.0 Pa.s at 25° C., and, to 100%, one or more suspending agents and surface active agents, water, and, optionally, other diluents, adjuvants, or other additives as desired.

Disclosed also is a method of protecting plant seeds and seedlings against crop pests, which comprises applying to the seeds the disclosed seed treater composition, and drying the treated seeds to remove excess liquid and to form an adherent coating on the seeds, the pest control agent being dispersed in the adherent coating.

Plant seed, for example wheat, barley, or corn seed, which has been protected against crop pests by an adherent coating containing 2,3-dihydro-2,2-dimethylbenzofuranyl-7-yl methylcarbamate pest control agent, which pest control agent comprises 0.1% to 6% by weight of the protected seed, is also disclosed.

9 Claims, No Sheets Drawing,

28 Pages Specification

The file of this unexamined application may be inspected and copies thereof may be purchased (849 O.G. 1221, Apr. 9, 1968).